Patented Oct. 28, 1952

2,615,855

UNITED STATES PATENT OFFICE 2,615,855

MANUFACTURE OF MOLDING POWDERS FROM SHELLAC AND RESINOLS LIKE BHILAWAN SHELL LIQUID OR CASHEW SHELL LIQUID

Salimuzzaman Siddiqui, New Delhi, and Krishen Kumar Sarin and Jyoti Prasad Varma, Poona, India, assignors to Council of Scientific and Industrial Research, New Delhi, India No Drawing. Application May 1, 1950, Serial No. 159,382. In India May 9, 1949

2 Claims. (Cl. 260—25)

This invention relates to a process for the manufacture of moulding powders from shellac and resinols such as bhilawan shell liquid or cashew shell liquid.

The term "resinol" applied to naturally occurring resinous liquids obtained from the pericarp of the nuts or incised trunks of plants belonging to the natural order "*Anacardiaceae.*" The application of the term to this category of products is based on the fact, that they are all of them resin forming (polymerisable) substances, composed mainly of di-hydroxy-benzene derivatives with a $C_{15}$ or $C_{17}$ straight unsaturated side chain, or polymers thereof. The term is broadened to include cashew shell liquid, which apart from a di-hydroxy-benzene derivative (cardol) also consists of a salicylic acid derivative, namely anacardic acid, which on thermal expulsion in the process of decortication of the nuts, is decarboxylated to a mono phenol (m, $C_6H_4OH \cdot C_{15}H_{27}$)

Other constitutents of this category of products are bhilawanol (1,2,3-$C_6H_3(OH)_2C_{15}H_{27}$) from the nuts of *Semecarpus anacardium*, Linn.; urishiol (1,2,3-$C_6H_3(OH)_2C_{15}H_{27}$) from the dried latex "Ki-Urushi" of the Chinese and Japanese lacquer plants, *Rhus vernicifera;* laccol from the Siamese Indo Chinese and Formosan lacquer plants, *Rhus ambigua, Rhus succedenea* and *Semecarpus vernicifera* respectively; and thitsiol from the Burmese lacquer plant, *Melanorrhoea usitata*, Wall. (1,2,4-$C_6H_3(OH)_2C_{17}H_{31}$). Bhilawanol and urishiol are so closely allied, that they actually differ from each other only in the number and position of the double bonds in the $C_{15}H_{27}$-side chain, common to both of them. This difference is, however, significant enough to bring about a far greater tendency in the case of urishiol towards polymerisation.

Bhilawan shell liquid or "bhilawan" resin is a darkish, resinous liquid occurring in the honeycomb structure of the pericarp of the nuts, which consists of Ca.50 to 70% of bhilawanol and 50 to 30% of polymerised product, the proportion mainly depending upon the age and conditions of storage of the nuts. The shell liquid can be obtained by any of the following processes:

(1) Extraction of the incised or lightly crushed nuts with lower boiling organic solvents, preferably petroleum ether, (2) Pressing out the nuts, preferably under heat in a hydraulic press or in a rotary crusher, (3) Heat expulsion of the liquid by roasting the nuts, preferably at 200 to 400° C., in retorts fitted with a lower outlet for draining out the shell liquid into the receiver system, (4) Expulsion of the liquid by exposing the nuts to superheated steam at temperatures ranging from 200 to 280° C., as described in the Indian Patents Nos. 32,237 and 34,872.

While in the above processes 1, 2 and 4 the shell liquid is obtained in the form in which it occurs in the nuts, in the process of dry heat expulsion (3), it is subjected to a partial thermal degradation and polymerisation, yielding a more viscous liquid from which hardly any "bhilawanol" as such can be obtained. It is this material, however, which on account of the comparatively easy and less costly procedure forms the actual commercial product in India at present Shell liquid obtained by any of the processes referred to above will, however, work suitably for the purposes of the present invention.

*Cashew shell liquid.*—The shell liquid obtained from the nut shells through solvent extraction consists mainly of anacardic acid ($C_6H_3(OH)(COOH)C_{15}H_{27}$)

and to the extent of about 10% of a long chain di-hydroxy-benzene derivative, "cardol." The article of commerce, however, obtained in the process of decortication of the nuts, entailing a prior roasting operation, consists mainly of the de-carboxylation product of anacardic acid.

Ki Urushi and other resinols from lacquer plants are dried "lattices," obtained by incising the trunk of the various trees, to which reference has already been made. They form viscous, blackish liquids, generally employed in East Asian countries since ancient times for lacquering purposes.

It is hitherto known that by adding resins, resinols or oils to bhilawan shell liquid and heating the mixture, a non-vesicating, drying product may be obtained for the manufacture of coating compositions, plastic compositions or like materials.

As described and claimed in our co-pending application, Serial No. 159,381, filed May 1, 1950, we have found that by the interaction of shellac (by which term we mean lac or shellac in any available form) and resinols such as bhilawan shell liquid or cashew shell liquid under steam pressure a homogeneous mass may be obtained. We have now found that this homogeneous plastic mass on curing by further heating and incorporation of fillers may be converted to moulding powders.

According to our present invention the process for the manufacture of moulding powders consists in interacting shellac and a resinol such as bhilawan shell liquid or cashew shell liquid under steam pressure, curing the homogeneous reaction product by further heating followed by incorporation with fillers. Thermo setting synthetic resins may also be incorporated to improve the heat resistance of the moulded articles.

The interaction of shellac and resinols is carried out by heating the two substances together under steam pressure until a homogeneous reaction product insoluble in hydrocarbon solvents is obtained.

The steam pressure may vary from 30-40 lbs. per square inch to 100 lbs. per square inch for about one hour to 5 hours. At higher pressures than 30-40 lbs. per square inch for one hour or on heating for longer periods than one hour at this pressure, the product tends to become less resistant to heat and requires longer curing periods or higher curing temperatures, which factors again contribute to a lowering of heat resistance. By curing is meant the further heating of the soft alcohol soluble homogeneous reaction product to obtain an insoluble hard resin. Where shellac and resinols have been interacted at steam pressure of 30-40 lbs. per square inch for about one hour the curing temperatures may vary from 110°-120° C. for 8 hours.

The amount of resinols added may be up to 1:1 part of shellac by weight for obtaining an insoluble resin on curing. The optimum amount is 18-20% of resinol on the weight of the shellac.

The fillers incorporated may consist of wood flour, sawdust, asbestos powder, cotton waste, bagasse, jute waste or the like.

Example I

Bhilawan shell liquid and shellac in the proportion of about 18-20% of the former by weight are heated with water in the autoclave at a pressure of 30 to 40 lbs. per square inch for 1½ hours. The reaction product which is a darkish brown, plastic, homogeneous mass, is then taken out of the autoclave, and cured at temperatures ranging from 110-120° C. for eight hours to obtain an insoluble, hard resin.

This resin is worked on hot rollers with fillers such as wood flour, sawdust, asbestos powder, cotton waste, bagasse, jute waste etc. and lubricants such as calcium stearate, aluminium stearate or stearic acid in proportions of 0.5% to 1% on the weight of the moulding powder at temperatures ranging from 110-130° C. for about 20-30 minutes, till a continuous sheet with a shiny appearance on the inside and a crinkly appearance on the outside, comes off cleanly from the rolls. The sheet becomes brittle on cooling and can be easily ground first in a fan-type disintegrator and then in a ball-mill. The product thus obtained is sieved to the desired mesh and is then ready for compression moulding. Moulding powders with about 40-50% of the resin can be suitably employed for injection moulding purposes as well. The moulding conditions are as follows:

Moulding temperature____ 140-160° C.
Moulding pressure_____ ⅓ ton to 1½ ton per square in.
Moulding cycle_____ 3 to 5 minutes Articles produced from this powder have better water resistance, tensile strength and flexural strength than those obtained from shellac or any other hitherto reported modified shellac moulding compositions. They have also better electrical properties and are superior in shock resistance.

Example II 84 parts by weight of powdered flake shellac and 16 parts of Bhilawan shell liquid were first intimately mixed at 90-100° C. and then heated in an autoclave with 100 parts of water. The autoclave was externally heated till the steam pressure developed inside was 35 lbs. per square inch. The autoclave was then maintained at 30-40 lbs. per square inch pressure for 1½ hours and then allowed to cool. The resultant mass which was darkish brown, homogeneous and plastic in character, was taken out of the autoclave and cured in an oven at 120° C. for nearly six hours, to obtain a hard resin which is insoluble in dilute alkalies, alcohol or benzene.

40 parts by weight of this resin were worked with 56 parts of wood flour, 4 parts of cotton waste as fibrous reinforcement and 0.5% of calcium stearate on the total weight of the moulding powder as lubricant, on hot rollers at a temperature range of 110-120° C. This process was continued till a continuous sheet with a shiny appearance on the inside and crinkly appearance on the outside, came off cleanly from the rolls. The sheet which turned brittle on cooling was ground first in a disintegrator and then in a ball-mill. The powder was sieved to 100 mesh and then pressed in compression moulds under the following conditions.

Temperature of pressing_____ 150-160° C.
Pressure _____ ½ ton per square inch
Time of pressing_____ 3 minutes The properties of the moulded article which was taken out of the mould after cooling, under pressure, to 100° C. were as follows:

(i) Flow and finish_____ Excellent
(ii) Specific gravity_____ 150/150° C. 1.320 inch
(iii) Tensile strength____ 4000-4500 lbs. per square in.
(iv) Flexural strength___ 7000-8000 lbs. per square in.
(v) Water absorption in
    24 hours dip_____ 1.3%
(vi) Machining qualities__ Good
(vii) Heat resistance _____ 150° F.

Example III

To 3 parts of the insoluble hard resin obtained as in Example II is added one part of phenol formaldehyde resin during the blending operation on the hot rolls. The resulting moulding powder when moulded under the same conditions as in Example II gives articles with nearly the same characteristics as noted in the aforesaid example except for higher heat resistance, which in this case goes up to 230° F.

We claim:

1. A molding powder comprising a mixture of an inert filler, phenol-formaldehyde resin and a cured reaction product of shellac and a resinol obtained from the pericarp of the nuts and incised trunks of plants belonging to the natural order Anacardiaceae, said molding powder being produced by subjecting a mixture of shellac and from about 18 to 20 per cent of said resinol, based on the weight of the shellac, to the action of steam at a pressure of from about 30 to 40 pounds per square inch for a period of from about 1 to 5 hours, followed by further heating at a temperature of from about 110° to 120° C. for from about 6 to 8 hours and then blending the resulting product with phenol-formaldehyde resin.

2. A molding powder comprising a mixture of an inert filler, phenol-formaldehyde resin and a cured reaction product of shellac and a resinol obtained from the pericarp of the nuts and incised trunks of plants belonging to the natural order Anacardiaceae, said molding powder being produced by subjecting a mixture of shellac and such a resinol, in quantity amounting to at least about 18 per cent by weight, based on the weight of the shellac, and not substantially exceeding an equal part by weight, to the action of steam at a pressure within the range of from about 30 to 100 pounds per square inch, for a period ranging from about 1 to 5 hours, then further heating the resulting reaction product to produce a hard insoluble resin and blending the latter with phenol-formaldehyde resin at elevated temperatures.

SALIMUZZAMAN SIDDIQUI.
KRISHEN KUMAR SARIN.
JYOTI PRASAD VARMA.

REFERENCES CITED

The following references are of record in the file of this patent:

UNITED STATES PATENTS

| Number | Name | Date |
|---|---|---|
| 2,225,034 | Connors | Dec. 17, 1940 |
| 2,269,347 | Schaufelberger | Jan. 6, 1942 |